United States Patent
Nayar et al.

(10) Patent No.: US 7,072,194 B2
(45) Date of Patent: Jul. 4, 2006

(54) POWER CONVERSION SYSTEM AND METHOD OF CONVERTING POWER

(75) Inventors: Chemmangot V. Nayar, Perth (AU); Michel Malengret, Cape Town (ZA); Lawrence J. Borle, Crawley (AU); Hooman Dehbonei, Perth (AU)

(73) Assignee: Curtin University of Technology, Bentley (AU)

( * ) Notice: Subject to any disclaimer, the term of this patent is extended or adjusted under 35 U.S.C. 154(b) by 0 days.

(21) Appl. No.: 10/950,575

(22) Filed: Sep. 28, 2004

(65) Prior Publication Data

US 2005/0063115 A1    Mar. 24, 2005

Related U.S. Application Data

(63) Continuation of application No. PCT/AU03/00382, filed on Mar. 28, 2003.

(30) Foreign Application Priority Data

Mar. 28, 2002   (AU) ...................................... PS1439

(51) Int. Cl.
*H02M 7/00* (2006.01)
*H02J 7/00* (2006.01)
(52) U.S. Cl. .......................................... 363/71; 363/65
(58) Field of Classification Search ................. 363/65, 363/71; 307/64, 66, 71, 72, 82, 83
See application file for complete search history.

(56) References Cited

U.S. PATENT DOCUMENTS

| 3,932,799 | A |   | 1/1976  | Frank et al. |
| 5,088,017 | A | * | 2/1992  | Yaginuma et al. ........ 363/21.04 |
| 5,946,206 | A | * | 8/1999  | Shimizu et al. ................ 363/65 |
| 6,243,277 | B1 | * | 6/2001 | Sun et al. ...................... 363/65 |
| 6,297,616 | B1 |   | 10/2001 | Kubo et al. |
| 6,297,976 | B1 | * | 10/2001 | Isono ........................... 363/65 |
| 6,486,632 | B1 | * | 11/2002 | Okushima et al. ........... 318/599 |
| 6,720,675 | B1 | * | 4/2004  | Azuma et al. ................. 307/85 |

FOREIGN PATENT DOCUMENTS

| DE | 19724356 C1  | 5/1998 |
| JP | 10225181 A   | 8/1998 |
| WO | WO 9614686   | 5/1996 |

* cited by examiner

*Primary Examiner*—Matthew V. Nguyen
(74) *Attorney, Agent, or Firm*—Edell, Shapiro & Finnan, LLC

(57) ABSTRACT

A power conversion system includes a first converter having a DC side and an AC side and a second converter having a DC side and an AC side. The DC sides of the converters are connected in series with a battery connected in parallel across the DC side of the first converter. The AC sides of the converters are connected in parallel across an AC voltage grid. A DC generating power source is coupled across the DC sides of both converters. The first converter is bi-directional with the second converter being either an inverter providing DC to AC conversion or alternately a bi-directional inverter.

25 Claims, 12 Drawing Sheets

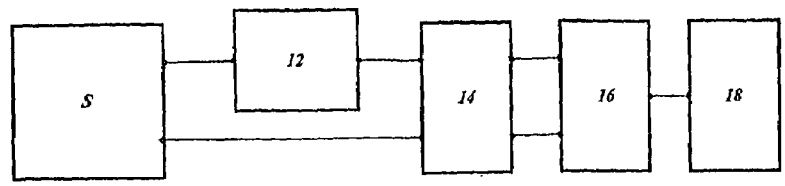
Figure 1.  PRIOR ART
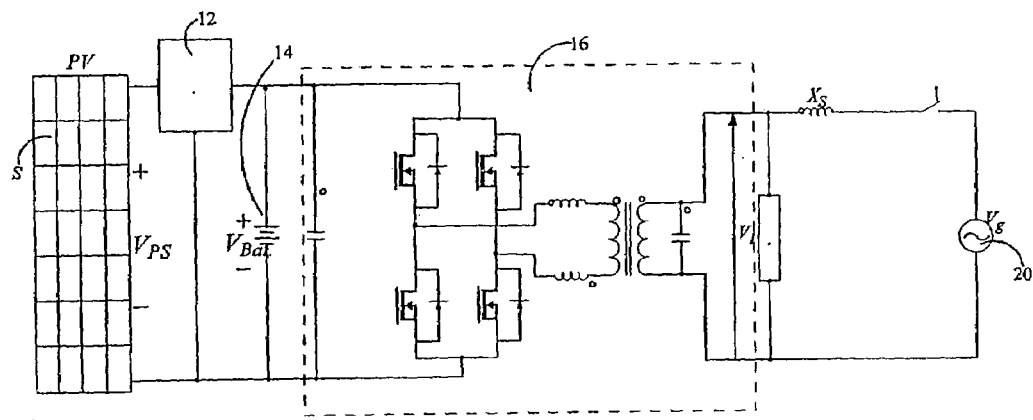
Figure 2  PRIOR ART
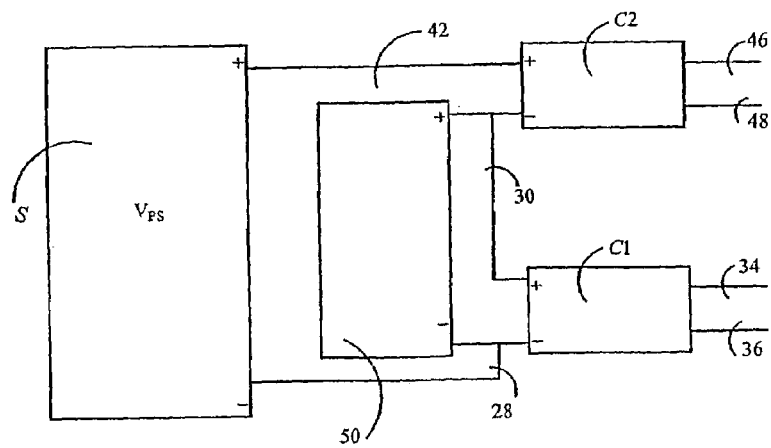
Figure 3a

POWER CONVERSION SYSTEM AND METHOD OF CONVERTING POWER

CROSS REFERENCE TO RELATED APPLICATIONS

This application is a continuation of PCT/AU03/00382, filed Mar. 28, 2003, and titled "Power Conversion System and Method of Converting Power," which claims priority under 35 U.S.C. §119 to Australian Application No. PS 1439, filed on Mar. 28, 2002, and titled "Power Conversion System and Method of Converting Power," the entire contents of which are hereby incorporated by reference.

FIELD OF THE INVENTION

The present invention relates to a power conversion system particularly, though not exclusively, adapted to provide continuous power to single or multiple phase AC loads when fed from separate DC and single or multiple phase AC sources. The invention further relates to a method of converting power.

BACKGROUND OF THE INVENTION

Many "Alternative" Energy Sources (AES), such as photovoltaic (PV) modules, produce maximum power at a DC output voltage that varies widely depending upon the solar insolation levels, ambient temperature and other variables. Wind energy, which is often extracted to a DC output using a wind generator (WG) with a rectifier, generally also requires a variable output voltage to extract the maximum power at any given time or wind speed. It is important to operate a PV or WG system at the DC voltage at which maximum power is obtained from these sources, so as to obtain the maximum benefit from the equipment capital expenditure. Since the DC voltage must vary, some form of power conversion is required to transfer energy from the source to a battery whose voltage is independently determined. Typically, a charge controller is used to transfer power from the PV or WG to a battery in a parallel configuration. The power from the battery is then converted to AC using an inverter to energise AC loads.

Referring to FIG. 1, a common topology for a power conversion system 10 is the series connection of a DC energy source S, for example a PV or WG, to a battery charger 12, battery 14 and an inverter 16. The inverter 16 provides an AC output for an AC load 18.

Power conversion systems are often manifested UPS systems. Recently, the application of PV assisted UPS systems for poor quality utility power grids has been reported, where a bi-directional inverter is used in an "in-line" configuration as shown in FIG. 2. In this configuration, as with the series configuration in FIG. 1, the battery charger 12 has to carry the full power of source S, regardless of whether the energy is intended to flow entirely into the battery 14, or out to the AC grid 20. Energy not intended for the battery 14 must then be converted again, resulting in a system where the cost and efficiency has not been optimised.

This system consists essentially of three energy sources (where a source could be a load, or negative source). The first is the DC source S itself, which supplies energy when available. The second is the battery 14, which acts as energy storage, accepting energy from the source S or the AC grid 20 at certain periods of time, and supplying energy to the AC grid 20 when energy is not available from the DC source S. The third energy source is the AC grid 20 itself, which could accept energy from the DC source S or the battery 14, or provide energy either to charge the battery 14 or supply loads 18.

In this system, a topological arrangement of power conversion equipment is required to provide all possible power flow requirements as efficiently as possible with the lowest aggregate converter power rating.

A single conversion between each of the three sources would have the greatest efficiency, since only one converter would be required for each conversion. However, this would require three converters, each with full power rating.

Throughout this specification and claims the terms "converter", "rectifier", "inverter" and "battery" are intended to have the following meaning, unless from the context of their use it is clearly apparent that an alternate meaning is intended:

Converter: any device which can convert power from AC to DC, or DC to AC uni-directionally or bi-directionally. Thus the term "converter" includes within its scope an inverter and a rectifier.

Rectifier: any device which converts AC power to DC power.

Inverter: any device which converts DC power to AC power.

Bi-directional Inverter: any device which converts AC power to DC power and DC power to AC power.

Battery any energy storage device comprising either a battery by itself, or any other type of energy storage device, or any energy storage device in combination with a second alternate energy source which has energy storage properties such as a fuel cell

SUMMARY OF THE INVENTION

It is an object of the present invention to provide a power conversion system having a plurality of converters with reduced aggregate power rating of the converters while still providing all power flow requirements, maintaining high overall efficiency and power factor.

According to the present invention there is provided a power conversion system including at least:
a first converter having a DC side and an AC side;
a second converter having a DC side and an AC side; and,
an electrical energy storage device;

wherein the DC sides of said first and second converters are connected together in series, and said electrical energy storage device is connected in parallel to the DC side of said first converter.

In one embodiment, said second converter is an inverter. However, in an alternative embodiment, said second converter is a bi-directional inverter.

In one embodiment, said first converter is an inverter. However, in an alternative embodiment, said first converter is a bi-directional inverter.

In one embodiment, the AC sides of said first and second converters are connected together in parallel. In an alternative embodiment, when said power conversion system is coupled between a DC power source, an AC grid and an AC load; the AC side of said second converter is connected to said AC grid, and the AC side of said first converter is connected to said AC load, with a coupling inductor placed between said AC grid and said AC load, and said DC power source connected across the DC sides of said first and second converters.

Preferably said electrical energy storage device is connected in parallel across the DC side of said first converter.

Preferably each of said first and second converters are in the form of any one of: single phase full bridge converter, a single phase half bridge converter, a three phase converter with three half-bridges, a phase shifted converter, a switch mode converter, and a voltage source inverter.

Preferably said electrical energy storage device includes a battery; or an alternate energy source with energy storage properties, such as, but not limited to, a fuel cell; or a combination of at least one battery and at least one alternate energy source with energy storage properties. Such options provide for a bi-directional or mono-directional energy storage with the ability for the alternate energy source to act as a fuel cell.

The present invention further provides an uninterruptible power supply (UPS) including at least:
a power conversion system as defined above;
a DC power source coupled across the DC sides of said first and second converters;
an AC grid coupled across the AC side of said first and second converter; and
an AC load coupled across the AC side of said first converter.

Preferably said AC load and AC grid are either tied directly together or with a coupling inductor between them.

Preferably said DC source provides energy at a variable voltage.

Preferably said DC source is an alternative energy source.

The invention further provides a method for converting power between a DC power source and an AC system including the steps of:
providing first and second converters, each having an AC side and a DC side;
providing an electrical energy storage device,
connecting the DC sides of said first and second converters together in series;
connecting the AC sides of said first and second converters together in parallel;
connecting said electrical energy storage device in parallel across the DC side of said first converter;
providing a DC port for connecting said DC power source across the DC sides of said converters; and,
providing AC ports for connecting said AC system in parallel across the AC side of said converters;
whereby, in use, when an AC system is coupled to said AC ports and a DC power source connected to said DC port, power from the DC power source can flow through said converters to said energy storage device and said AC system; power from said electrical energy storage device can flow through said first converter to said AC system; and, power from said AC system can flow through said converters to said electrical energy storage device.

Preferably the step of providing an electrical energy storage device includes providing a battery; or an alternate energy source with energy storage properties, such as, but not limited to, a fuel cell; or a combination of at least one battery and at least one alternate energy source with energy storage properties. When such a combination is provided the energy storage device can be bi-directional or mono-directional.

Preferably the step of connecting the AC sides of said first and second converters together in parallel includes connecting said AC sides either directly or with a coupling inductor between them.

Preferably said method includes the step of controlling real power flow of said second converter so as to regulate the DC voltage or DC current of said DC power source to thereby provide for maximum power point tracking (MPPT) of said DC power source.

Preferably said method includes the step of controlling real power flow of said second converter to regulate the amount of energy delivered to or from said electrical energy storage device.

Preferably said method further includes the step of controlling real power flow of said second converter to regulate the amount of energy delivered from said DC power source.

Preferably said method further includes the step of controlling reactive power flow of either or both of said first or second converters to achieve a desired power quality on the AC side.

Preferably, when said AC system includes an AC load and a parallel coupled AC grid, said method further includes the step of controlling reactive power flow of either of said first or second converters to regulate the power factor of said AC grid.

Preferably said method further includes the step of connecting a coupling inductor between said load and said AC grid.

Preferably said system further includes a step of controlling the real power flow of either of said first or second converters so as to regulate the AC load voltage magnitude or wave form.

Preferably said method further includes the step of controlling the reactive power flow of either of said first or second converters so as to regulate the AC load voltage magnitude or wave form.

Preferably said method further includes the step of controlling the harmonic power flow of either of said first or second converters so as to regulate the AC load voltage magnitude or wave form.

Preferably said method further includes the step of controlling reactive power flow of either of said first or second converters to provide active VAR compensation for said AC grid.

Preferably said method further includes the step of controlling harmonic power flow of either of said first or second converters to provide active cancellation of current harmonics of said AC system.

DESCRIPTION OF THE DRAWINGS

Embodiments of the present invention will now be described by way of example only with reference to the accompanying drawings in which:

FIG. 1 is a block diagram of a prior art stand-alone renewable energy power system;

FIG. 2 is a schematic diagram of a prior art grid-connected renewable energy uninterruptible power supply;

FIG. 3a is a block diagram of an embodiment of the present power conversion system;

FIG. 9b is a simplified equivalent circuit of the system shown in FIG. 3c or FIG. 9a;

FIG. 11a is simulation result of the currents, voltages and power flow within the power conversion system shown in FIG. 9a at MPPT when both a DC energy source and energy storage device of the system supply a load as configured in FIG. 9a;

DETAILED DESCRIPTION OF PREFERRED EMBODIMENTS

Figure 3B:
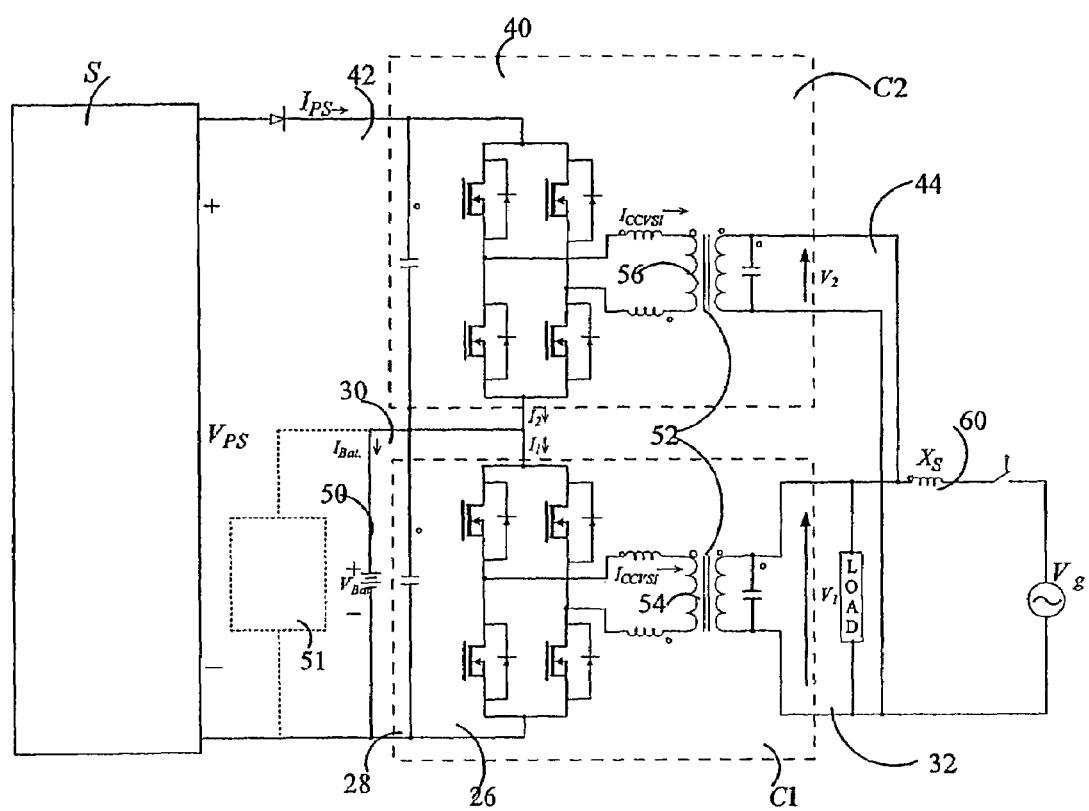
FIG. 3b is a schematic representation of a first embodiment of a power conversion system in accordance with the present invention.
Figure 3C:
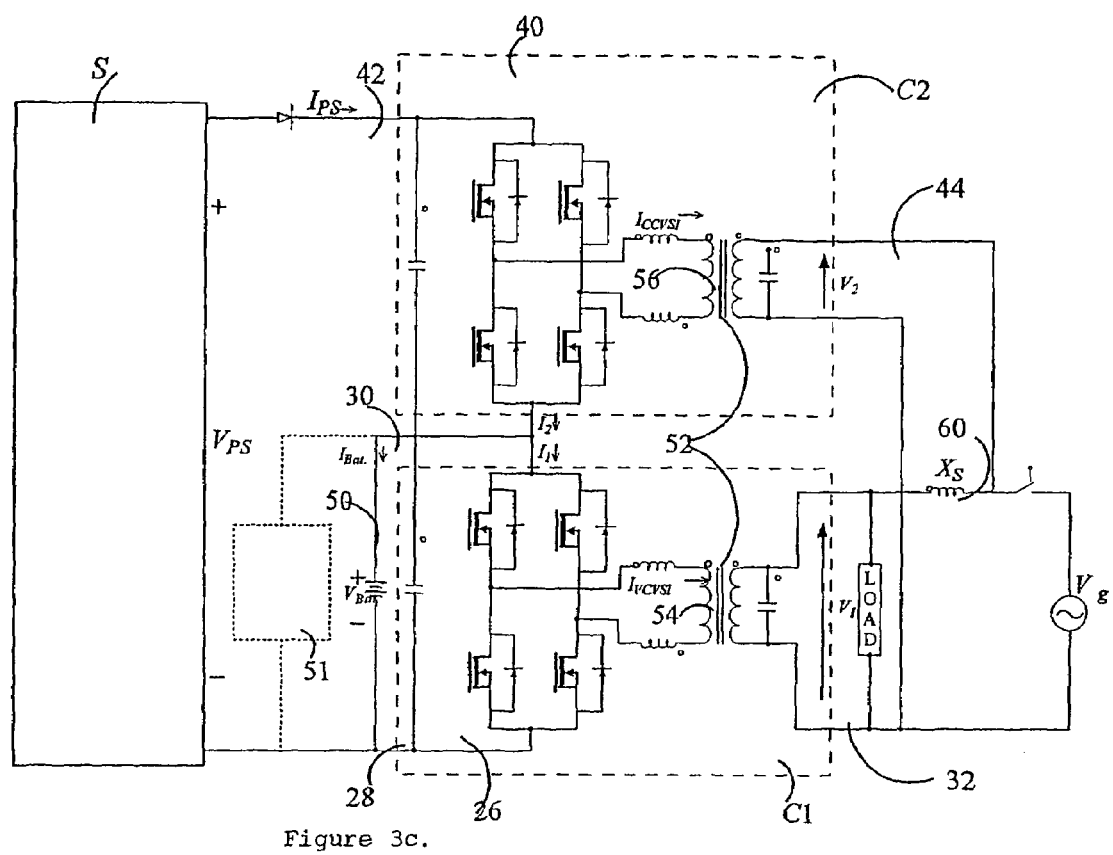
FIG. 3c is a schematic representation of another embodiment of a power conversion system in accordance with the present invention.

Referring in particular to FIGS. 3a, 3b and 3c, a single phase power conversion system 22 in accordance with the present invention includes a first converter C1 having a DC side 26 manifested by lines 28 and 30 and an AC side 32 manifested by lines 34 and 36; and a second converter C2 having an DC side 40 manifested by lines 30 and 42 and an AC side 44 manifested by lines 46 and 48. The system 22 further includes an electrical energy storage device in the form of a battery 50. It should be noted that the power conversion system can be realised as a multiphase, and in particular a three phase, system. The following description of a single phase system can also be taken as a description of one phase in a multiphase system.

In each of these embodiments, both of the converters C1 and C2 are bi directional although in an alternate embodiment, the converter C2 may be in the form of an inverter providing power conversion from DC to AC only. Of course this may also be manifested by forming the converter C2 as a bi directional converter but operating it only in an inverter mode.

The DC sides 26 and 40 of the converters C1 and C2 are connected in series and have, applied across them, i.e. across lines 28 and 42, DC voltage source S typically from an alternate energy source such as a photovoltaic panel, wind generator or the like. The voltage produced by the DC power source is represented as voltage $V_{P_S}$.

In the embodiment depicted in FIG. 3b, the AC sides 32 and 44 of the converters C1 and C2 respectively are coupled in parallel, each through a transformer 52 and across the grid 20. It should be noted that the two transformers could be combined into one transformer with three windings. A coupling inductor Xs is coupled in series between the load 18 and grid 20. Together, the AC grid 20, coupling inductor $X_s$ and the load 18 can be considered as an AC system 60. In various applications of the power conversion system 22, the AC sides of the converters C1 and C2 are coupled to the AC system 60 which may include one or both of the AC grid and the AC load.

In the embodiment depicted in FIG. 3c, the AC side 32 of converter C1 is synchronised with the grid 20 and maintains constant voltage across the load 18, while the AC side 44 of the converter C2 is directly coupled across the grid 20 and is able to supply controlled current to the grid 20 or to the converter C1 through the decoupling inductor Xs. Together, the AC grid 20, coupling inductor $X_s$ and the load 18 can be considered as an AC system 60. In various applications of the power conversion system 22, the AC sides of the converters C1 and C2 are coupled to the AC system 60 which may include one or both of the AC grid and the AC load.

An energy storage device such as a battery 50 is coupled in series with the DC side 40 of the converter C2 and in parallel with the DC side 26 of the converter C1. It should be noted however that the energy storage device may include a battery 50 (or plurality of batteries) per se, or a further alternate energy source 51 (also shown in FIG. 3b) with energy storage properties, such as, but not limited to a fuel cell which uses hydrogen fuel to produce DC power, or a combination of at least one battery and at least on alternate energy source with energy storage properties. It will be recognised that providing such a combination will produce an energy storage device which can be bi-directional or mono-directional. For easy of reference the expression "battery 50" is used to denote either the battery 50 per se, or the source 51 with storage properties, or a combination thereof.

As explained in greater detail below, the converter C2 can control the voltage difference between the battery 50 and the voltage source S and thus provide maximum power point tracking (MPPT) for the source S. While this could be achieved using AC current control as the inner most control, any method resulting in effective power flow control would be appropriate. The power flow in the converter C2 is controlled to either control the battery 50 energy flow, or to provide an AC source of power for the AC system 60.

It is important to note that the specific form or configuration of the converters C1 and C2 are not critical to the operation of embodiments of the present invention. Rather, it is the relative connection of the converters C1 and C2 which provides the beneficial effects of embodiments of the present invention.

Figure 4:
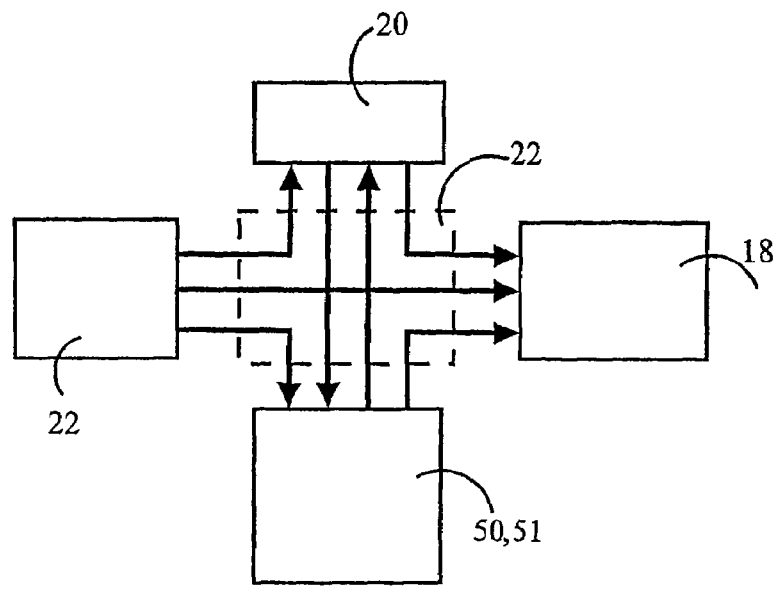
FIG. 4 is a representation of power flow capability of the power conversion systems depicted in FIGS. 3b and 3c.

The power flow capabilities of the power conversion system 22 are illustrated most clearly in FIG. 4. Specifically, the power conversion system 22 can provide any one or more, or all of, the following power flow requirements with high efficiency:

Delivering power from the source 5 to either the battery 50, AC load 18, or the AC grid 20 at the maximum power point voltage and current.

Charging the battery 50 from the source S, while only requiring a portion of the energy to be subjected to conversion losses.

Charging the battery 50 from the AC grid 20, operating with fully controlled power factor.

Providing uninterruptible power supply from the source S or battery 50 at constant high quality AC voltage when the AC grid 20 is not able to supply power satisfactorily (UPS operation).

Providing reactive power support to the AC grid 20.

Providing load voltage stabilisation under a varying or insufficient AC grid 20 voltage.

In the case of the embodiment of FIG. 3c, providing load voltage stabilisation under a varying or insufficient AC grid 20 voltage, while maintaining unity power factor operation from the AC grid.

Providing active power filtering to reduce the harmonic currents drawn from the AC grid 20 by the AC load 18.

Providing a demand side management capability whereby power is produced from the source S and/or the battery 50 to meet the required demand.

Providing smooth transition (including synchronisation) between any of the requirements above, and specifically between AC grid connected and UPS operation.

The power flow requirements listed above can be met with the system 22 in the following manner:

A portion of the source S power can be delivered directly to the battery 50, where that portion is the source S power times the battery voltage $V_{bat}$ divided by source voltage $Vp_S$. The remainder of the source S power can also be delivered to the battery 50 by routing the power out the converter C2 to the AC system 60, and then rectifying it back into the battery through the converter C1. Some or all of the source S power can be delivered directly to the AC system 60 using both converters C1, C2 operating in inverter mode. The power flow from the converter C1 onto the AC system 60 will take away from the power delivered to the battery 50.

The converter C2 can be controlled so as to maintain the source S at the maximum power point voltage and current.

The converter C1 can operate in rectifying mode to charge the battery 50 from the AC grid 20 through the coupling inductor $X_s$, regardless of how the converter C2 is being controlled. In this case, the power from the AC grid 20 and the portion of power from the source S will add as power in to the battery 50.

Either converter C1, C2 can operate with reactive power independent of the real power flow. Hence the system 22 power factor can be fully controlled. Also, with inductor $X_s$ in place between the system 22 and AC grid 20, the AC load voltage can be regulated by controlling the reactive current.

The two converters C1, C2 can operate together to provide uninterruptible power supply from the source S and/or battery 50 at constant high quality AC voltage when the AC grid 20 is not able to supply power satisfactorily (UPS operation).

When the AC grid 20 is connected, either converter C1, C2 could operate to provide active power filtering of harmonic currents drawn from the AC grid 20 by the AC load 18.

When operating without the AC grid 20, at least one of the converters C1, C2 should operate in AC voltage control mode to produce the required AC voltage to feed the AC load 18. Preferably, both converters C1, C2 are operated in parallel in AC voltage control mode.

With this topological configuration, most power conversions are handled with a single conversion. The only case that requires a double conversion is when all of source S power is supplied to the battery 50. In this case, that power which is provided to the AC grid 20 by the converter C2 must be rectified back through the converter C1 into the battery 50. This represents a circulation of a small portion of the power through two conversions, while much of the power is fed directly into the battery 50 without any conversion.

The control of the power flow in the converter C2 is manifested as both the control of the AC current, and the control of the DC current, both at instantaneously fixed voltages. The DC voltages are controlled over a longer time period through the control of the power flow and the resulting variance in the dc capacitor voltages.

The converter C1 should be sized for the greatest of:

(a) the maximum required charging power from the AC grid 20, or (b) the maximum charging power from the source S times the largest battery 50 voltage over the lowest $Vp_S$ voltage, or (c) the maximum required AC load 18 to be supplied from the battery 50 alone.

The converter C2 should be sized for the maximum source S current and a voltage range from a minimum value to the minimum plus the required difference from minimum to maximum MPPT DC voltages.

For example, if the source S is a photovoltaic array with a required MPPT voltage range of from 120 to 160 volts, the lower converter C1 and battery 50 may have a DC voltage of 100 volts, and the converter C2 may be designed to vary between 20 volts and 60 volts DC. Hence inverter power ratings would be $P_{DCmax} \times 60V/160V$ for the converter C2, and be $P_{DCmax} \times 100V/120V$ for the converter C1 (assuming the converter C2 maximum power requirement is determined from point (b) above). This would give an aggregate converter power rating of 121% of $P_{DCmax}$.

As previously mentioned, each of the converters C1, C2 could be any type of AC-DC power converter with the specified power flow capability including half bridge converters, phase shifted converters, and any other AC-DC converter. Further, any control mechanism could be used in either of the converters C1, C2 including, but not limited to, bipolar pulse with modulation (PWM) or unipolar PWM with voltage modulation techniques such as space vector modulation, or current modulation techniques such as hysteresis or ramptime current control.

Figure 5:
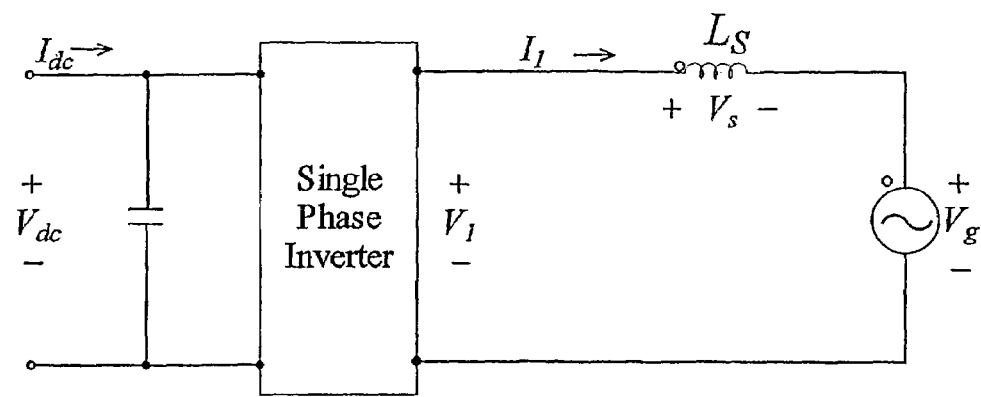
FIG. 5 is a representation of a converter used in the power conversion system in accordance with the present invention.
Figure 6:
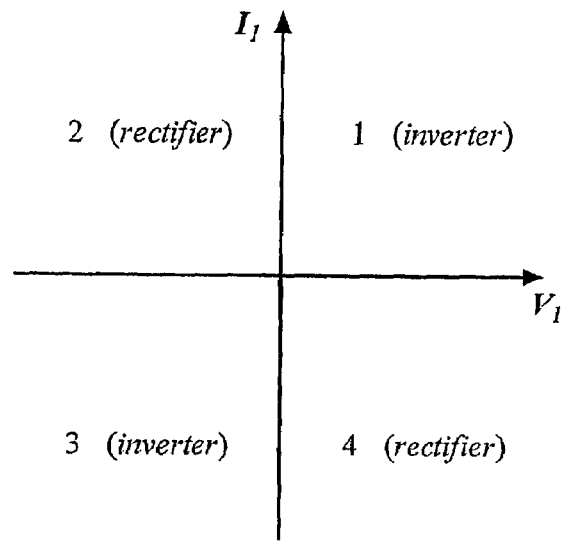
FIG. 6 is a diagrammatic representation of the operational modes of the converter shown in FIG. 5.

Methods of operation and control of the converter C1 will now be described with reference to FIGS. 5–7. FIG. 5 represents the converter C1 coupled by inductor $X_s$ to the grid 20, with the converter C1 represented as a single phase inverter (SPI) realised as a switch mode converter (SMC).

The output voltage $V_1$ of converter C1 has a predominant sinusoidal fundamental component used for power flow. The SPI with full-bridge SMC is able to act as an inverter or a rectifier, as shown in FIG. 6. In quadrant 1 and 3 referring to the polarity of $V_1$ and $I_1$, the converter C1 behaves as an inverter and power from the DC side flows to the AC side. Similarly, in quadrant 2 and 4, power from AC side flows to the DC side so that the converter C1 behaves as a rectifier.

Figure 7A:
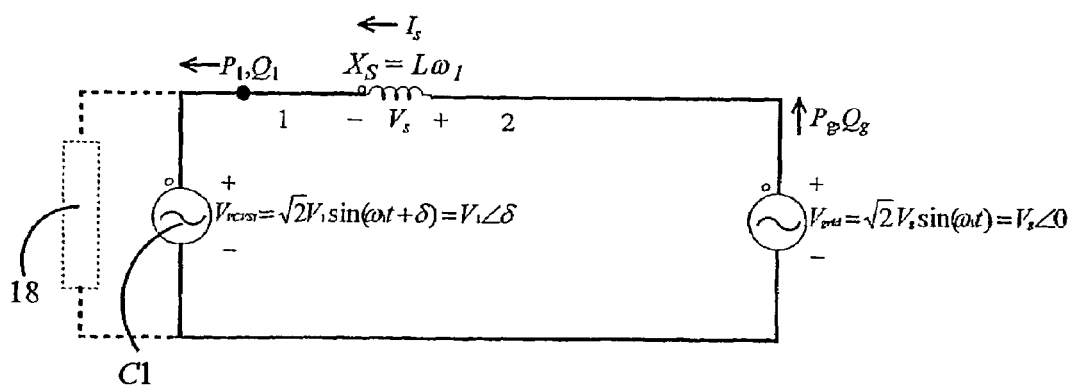
FIG. 7 is a simplified equivalent circuit of the fundamental component operation of the converter shown in FIG. 5.

A simplified equivalent circuit diagram for converter C1 connected to grid 20 through coupling inductor $X_s$ is shown in FIG. 7. As the AC load 18 is in parallel with the converter C1 and has the same voltage, for simplicity it can be omitted for the purposes of explaining the control of the converter C1.

Referring to the phasor diagram of the converter C1 coupled to the grid 20 in FIG. 8, the converter C1 power consumption can be derived as follows below.

$$P_1 = V_1 \cdot I_1 \cdot \cos(\alpha) \quad (1)$$

$$I_S = \frac{V_g \angle 0 - V_1 \angle \delta}{jX_s} = -\frac{V_1 \cdot \sin\delta}{X_s} - j \cdot \frac{V_g - V_1 \cdot \cos\delta}{X_s} \quad (2)$$

$$(I_1)_p = -\frac{V_g \cdot \sin\delta}{L_s \omega_1} \quad \& \quad (I_1)_q = -\frac{V_g - V_1 \cdot \cos\delta}{L_s \omega_1} \quad (3)$$

$$S_{g1} = -\frac{V_1 \cdot V_g \cdot \sin\delta}{X_s} + j \cdot \frac{V_g^2 - V_1 \ldots \cos\delta}{X_S} \quad (4)$$

$$P_1 = P_2 = -\frac{V_1 \cdot V_g \cdot \sin\delta}{X_s}, \quad (5)$$

$$Q_2 = Q_1 + Q_S = \frac{V_g^2 - V_1 \cdot V_g \cdot \cos\delta}{X_S}$$

Where $V_g \angle O$ is the grid voltage at 0 angle and taken as a reference

α is the angle between output voltage $V_1$ and output current $I_1$ of converter C1

δ is the phase angle between grid voltage $V_g$ and output voltage $V_1$. (This angle can be controlled by varying the start of the PWM waveform of converter C1.

$S_{g1}$ is the complex power flow to the grid 20

These equations show that the power produced through the converter C1 is dependent on the magnitude of the grid voltage relative to the magnitude of the output voltage of the converter C1, and the phase angle between them. The power flow between the AC grid 20 and the converter C1 can be controlled by varying the phase angle between them. Also, the reactive power flow between the AC grid 20 and the converter C1 can also be controlled by controlling the output voltage and phase angle of each converter.

The converter C2 can be modelled as current controlled source in parallel with the grid 20. Since converter C2 is directly connected to the AC grid 20 as shown in FIG. 3c, it can be controlled to provide the reactive power required to flow through the coupling inductor $X_s$. In this way, no reactive power is required from the AC grid, and power delivered from the AC grid 20 is delivered at unity power factor.

The active and reactive power flow from the grid toward the converter C1 can be calculated on a per unit basis in accordance with equation (6).

$$V_{base} = V_1, \quad Z_{base} = X_s, \quad S_{base} = \frac{V_{base}^2}{Z_{base}} \quad (6)$$

Figure 8A:
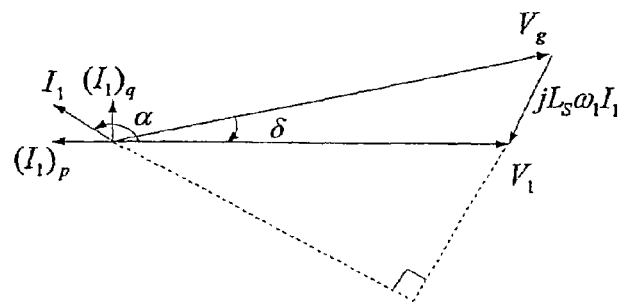
FIG. 8a is a phasor diagram of the converter shown in FIG. 7.
Figure 8B:
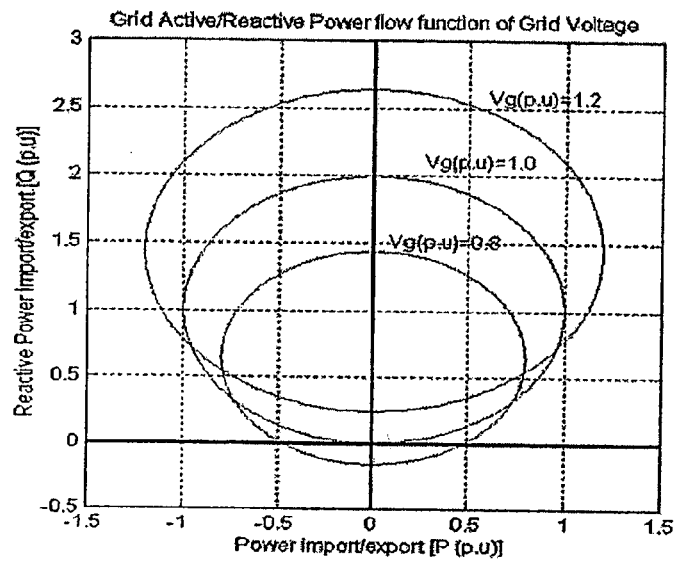
FIG. 8b is a diagrammatic representation of the grid active and reactive power coupling as a function of grid voltage for the power conversion system shown in FIG. 5.

The variation of reactive power in reference to active power at different per unit grid voltages can be calculated or modeled in accordance with equation (7) below and represented graphically in FIG. 8b.

$$P_{2P.U}^2 + (V_{gP.U}^2 - Q_{2P.U})^2 = V_{gP.U}^2 \quad (7)$$

Figure 8C:
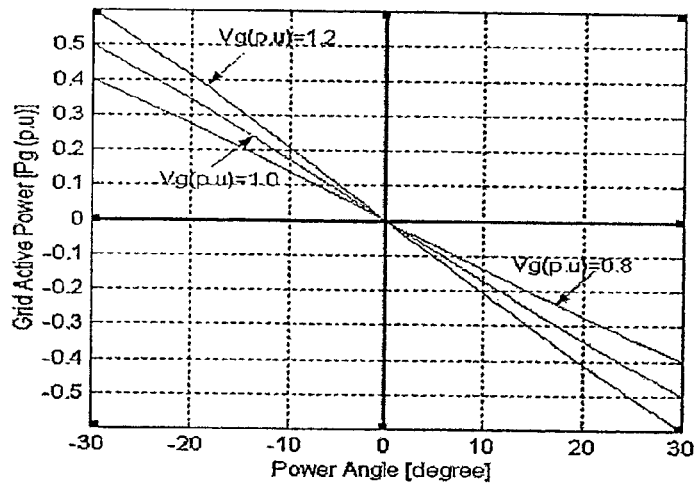
FIG. 8c is a diagrammatic representation of the grid active power in terms of phase angle between load and grid voltages.
Figure 8D:
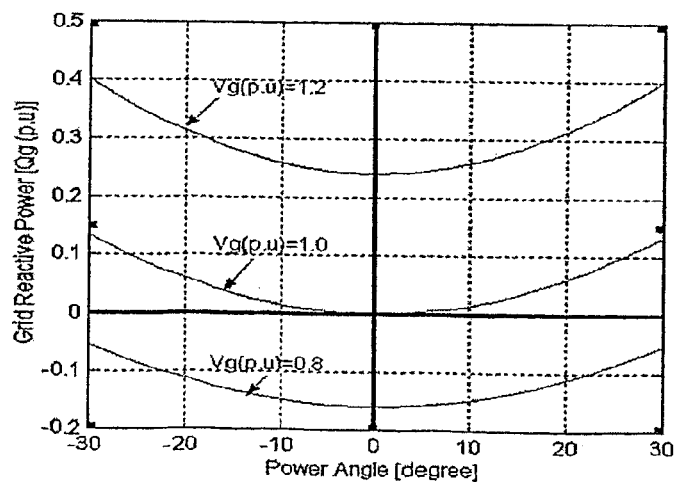
FIG. 8d is a diagrammatic representation of the grid reactive power in terms of phase angle.
Figure 8F:
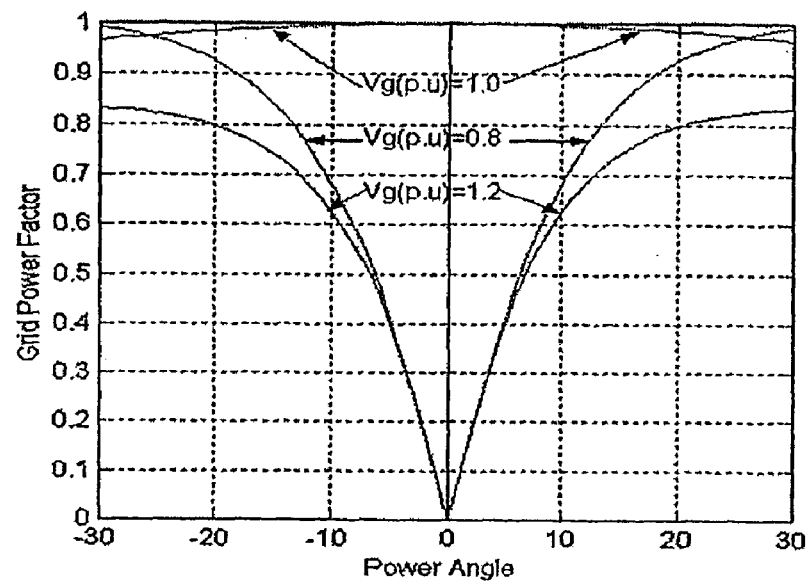
FIG. 8f is a diagrammatic representation of the grid power factor in terms of phase angle.
Figure 8G:
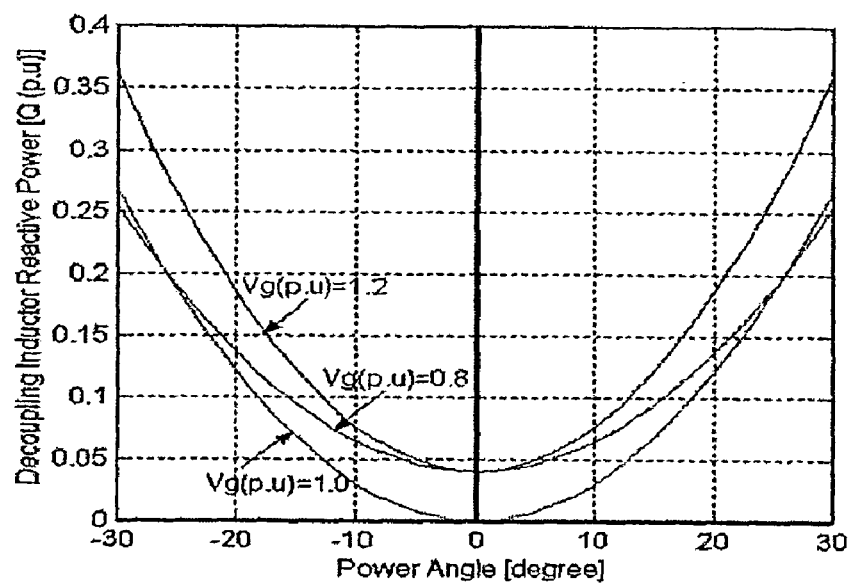
FIG. 8g is a diagrammatic representation of the coupling inductor reactive power consumption in terms of phase angle.

The range of power angle variation is a major factor for choosing the right size of the decoupling inductor $X_S$. The power angle (δ) variation is usually limited to less than 30 degrees. The variation of import/export of active $P_{gpu}$ and reactive power $Q_{gpu}$ from the grid at different power angles is shown in FIGS. 8c and 8d. The reactive power flow from grid 20 to a converter C1 is always positive when the voltage of the grid is higher than the converter. The higher the grid voltage the more active power flows. It can be seen that the grid power factor deteriorates when $V_{gpu} \neq 1$ (FIG. 8e). It is preferable to operate converter C1 at large angle (δ) in the grid-connected mode to be able to get a higher power factor. However, the larger the angle, the more coupling inductor $X_s$ reactive power $Q_{xs}$ consumption (FIG. 8g). The amount of reactive power consumed by coupling inductor can be modelled by equations (8)–(10) below. In practice for having reasonable reactive power flow and also reducing size of the decoupling inductor the maximum power angle is chosen around 20 degree.

$$Q_{Xs} = \frac{V_s \cdot V_s^*}{Z_s^*} = \frac{|V_s|^2}{-j \cdot X_s} = \frac{|V_g \angle 0 - V_1 \angle \delta|^2}{-j \cdot X_s} \quad (8)$$

$$Q_{Xs} = \frac{(V_g - V_1 \cdot \cos\delta)^2 + V_1 \cdot \sin^2\delta}{X_s} \quad (9)$$

$$Q_{XsP.U} = (V_{gP.U} - \cos\delta)^2 + \sin^2\delta \quad (10)$$

Where $V_s$ is the voltage across the inductance $X_s$, and $Z_s$ is the inductive reactance, which can be approximated as $X_s$ Another way of controlling the power flow in either converter C1, C2 when connected with the AC 20 grid is to switch the switches of the converters C1, C2 so as to directly control the AC current in the AC side inductor. One such method is described in detail in U.S. Pat. No. 5,801,517 the contents of which are incorporated herein by way of reference. The converters essentially become an AC current source, with the magnitude and phase of the current being controlled relative to the AC grid voltage. In this way, the real and reactive power flow can be independently controlled. Furthermore, the harmonic content of the current waveform can also be controlled.

The power flow in converter C2 as depicted in FIG. 3c can be managed through the direct control of output AC current 12 by any known current control techniques.

When the system 22 is required to operate stand-alone, without the presence of the AC grid 20, or if the AC grid 20 is particularly weak, it is necessary to operate one or both of the converters C1, C2 in AC voltage source mode. In this case, anticipating non-linear local AC loads, the converters must produce a sinusoidal AC voltage at the fundamental frequency (50 or 60 Hz) while producing non-sinusoidal currents. This is the normal operation of stand-alone voltage-source inverters.

As mentioned previously, each converter could be operated with any of a number of different control techniques to produce the required power flow. The three most likely control techniques are voltage phase and amplitude control, or direct current control when grid connected, or AC voltage source operation when operating stand-alone, as described above, but other techniques can be used to achieve the desired power flow. In an optimum implementation of this system 22, the control technique would be selected so as to optimise the immediate power flow objectives.

Figure 9A:
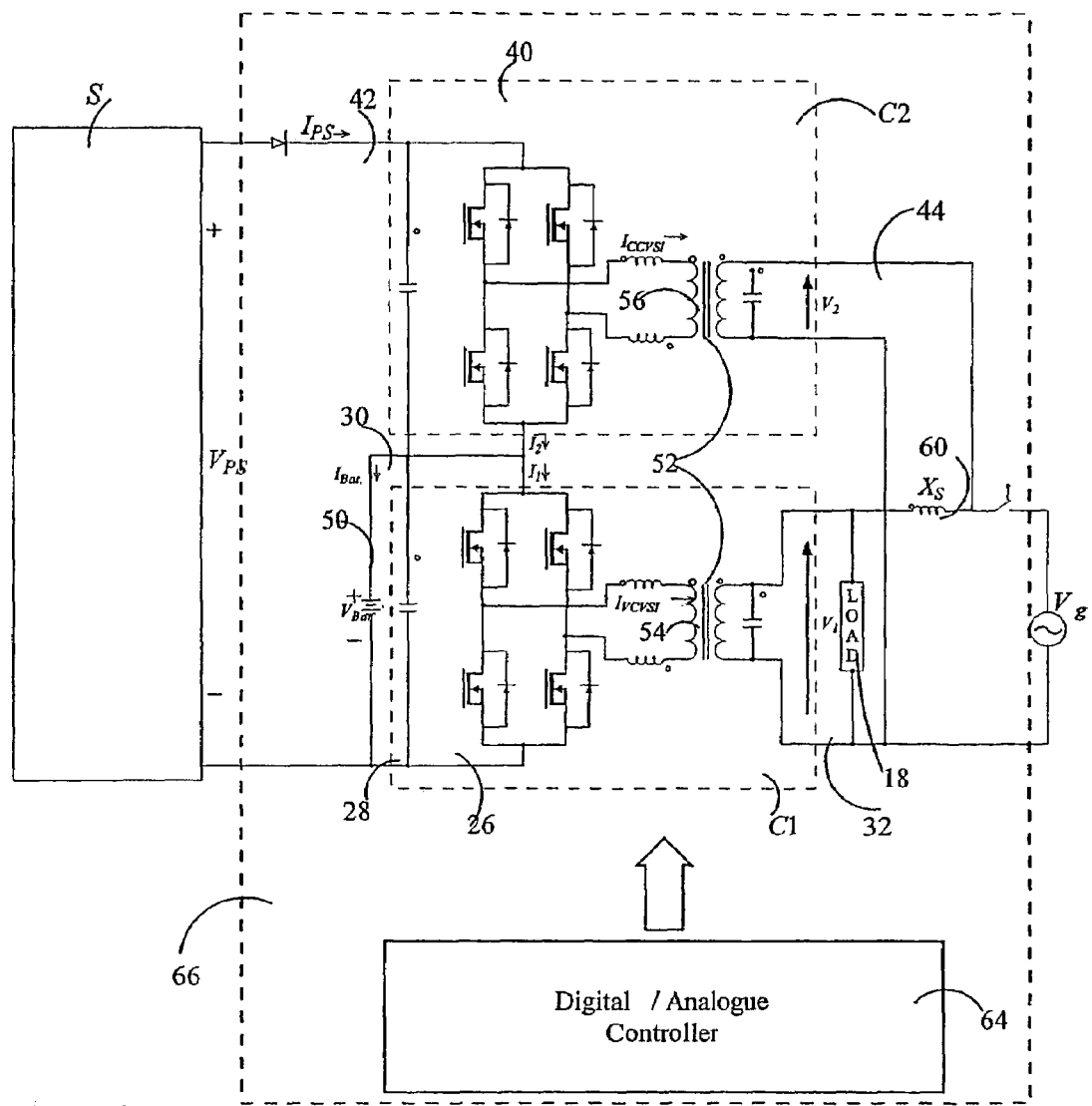
FIG. 9a is a schematic circuit diagram of system depicted in FIG. 3c when coupled with a photovoltaic panel and including a controller.
Figure 9B:
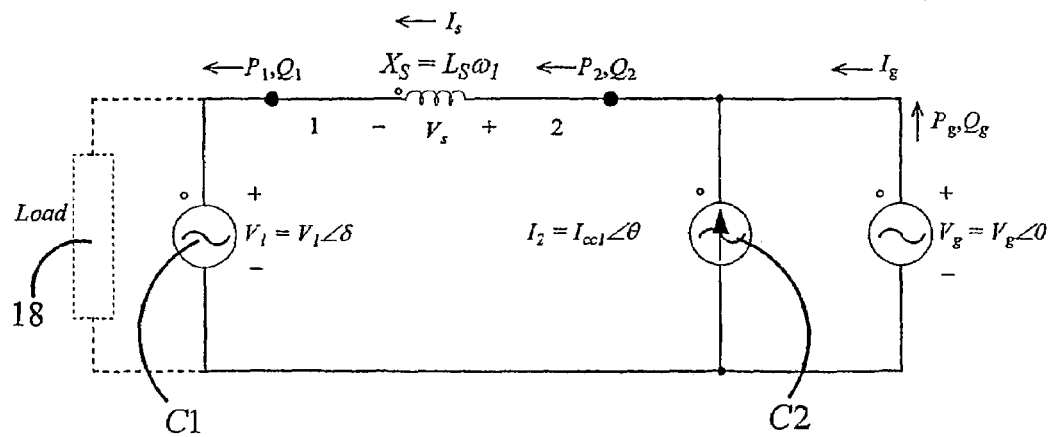

FIG. 9a depicts, an embodiment of the system 22 is particularly useful to provide power-conditioning in weak grids 20 which suffer from power quality issues such as power interruption, sustained under/over voltage and poor power factor. FIG. 9b is an equivalent circuit model of the embodiment in FIG. 9a. In this embodiment the DC power sources is a photovoltaic panel PV. Operating the converter C2 in current control mode (CCVSI) as a maximum power point tracking battery charger, the battery 50 is able to fully charge and also discharge within the permissible current rate and level. Operating converter C1 in voltage control mode (VCVSI) as a voltage and frequency stabiliser, the battery 50 is able to fully charge and also discharge within the permissible current rate and level. A digital signal processor based controller 64 is used to control the system 22 to achieve maximum life cycle of the battery 50. The combination of the controller 64 and system 22 can be considered as a power conditioner 66 and is able to operate not only in stand-alone mode, but also in grid-connected configurations. When grid connected, the power conditioner 66 provides real and reactive power $P_{PL}$, $Q_{PL}$ support.

The different functions of the system 22 in this configuration can be expressed as:
   Extracting the maximum energy from the photovoltaic panel PV
   Supplying the load 18 at high power quality
   Charging the Battery at full capacity and higher efficiency
   Drawing unity power factor current from the AC grid 20
   Providing backup power from the battery 50
   Delivering excess photovoltaic energy to the AC grid 20 (demand side management)
   Active filtering As the converters C1, C2 are in series on the DC side, the total voltage of source S is shared between them. The source S power is split between the two converters proportional to the respective dc voltages of the two converters. Since the battery is directly connected to the DC side of the converter C1, that portion of the source S power can be delivered to the battery with no conversion losses. The power delivered to the converter C2 must be delivered to the AC side, and can then be routed back through the converter C1 to the battery 50, if desired (if operating stand-alone, with no ac loads). In this mode, equation (11) describes the total efficiency of the MPPT for charging the battery at stand-alone.

$$\eta_{Total} = \frac{P_{out}}{P_{in}} = \frac{V_{bat} \cdot I_{bat} + \eta_{c1}(V_{PS} - V_{bat}) \cdot I_2 \cdot \eta_{c2}}{V_{PS} \cdot I_{PS}} \quad (11)$$

where in steady state and no load $I_{bat} = I_{PS} = I_2$, thus:

$$\eta_{Total} = \frac{V_{bat} + \eta_{c1}(V_{PV} - V_{bat}) \cdot \eta_{c2}}{V_{PS}} = \frac{1 + \eta_{c1} \cdot \eta_{c2}\left(\frac{V_{PS}}{V_{bat}} - 1\right)}{\frac{V_{PS}}{B_{bat}}}. \quad (12)$$

Figure 10:
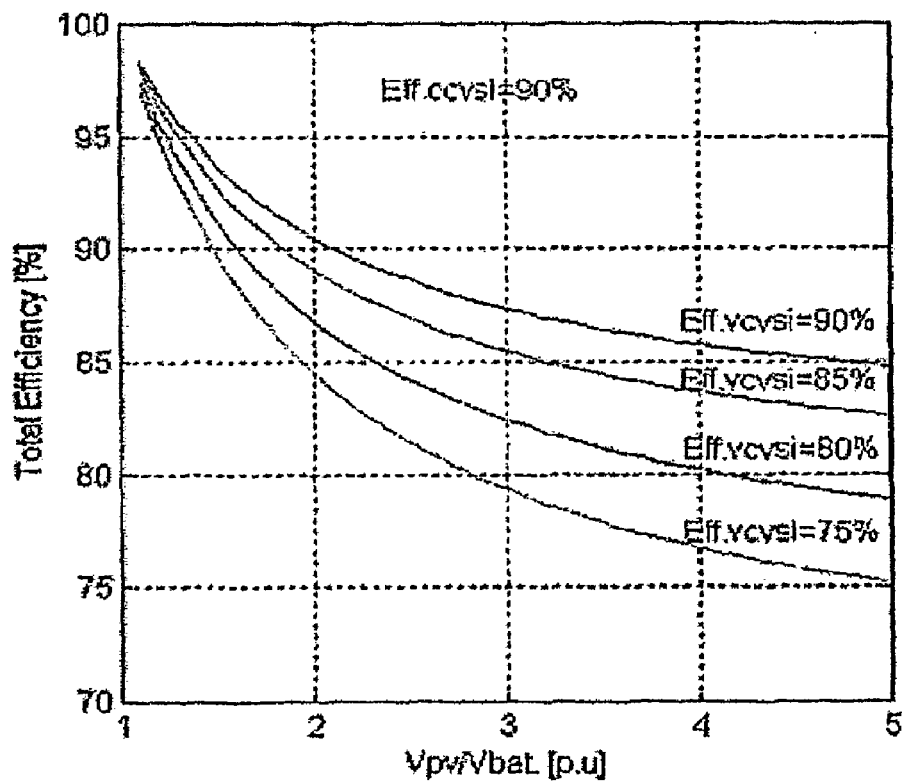
FIG. 10 is a diagrammatic representation of the overall efficiency improvement of the use of an embodiment of the power conversion system for charging battery at MPPT.

As shown in FIG. 10, taking the line with $\eta_{c2}=90\%$, the total captured efficiency of the system 22 is higher that the efficiency of a single converter C2 when the PV voltage is less than twice the battery voltage.

Figure 9C:
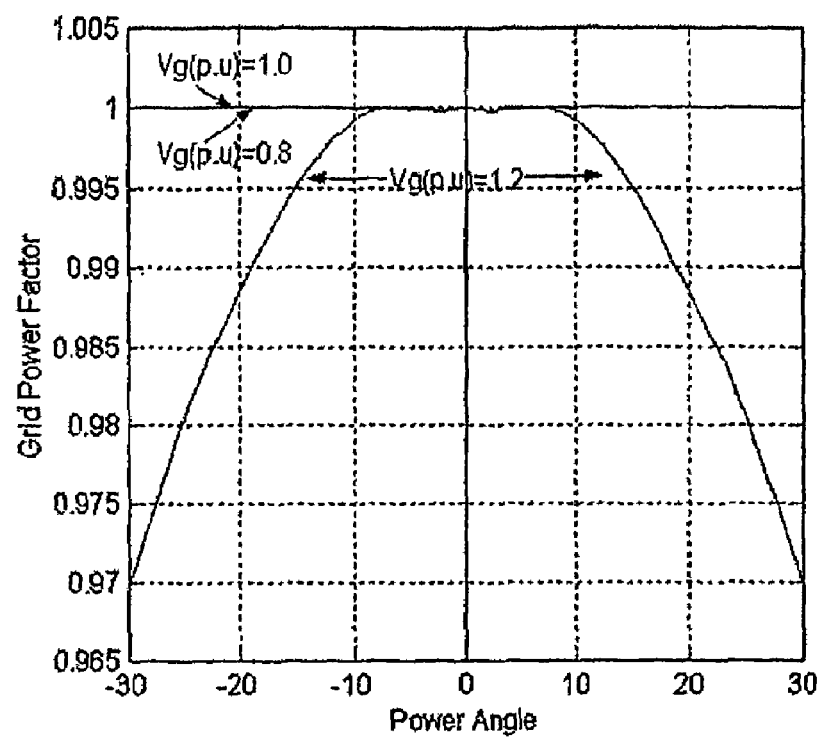
FIG. 9c is a diagrammatic representation of the grid power factor improvement by the use of an embodiment of the power conversion system.

In the dual converter topology of the system 22, the converter C2 (in current control mode) can provide the reactive power required for operation of the system 22 at unity power factor. In an example case, the source S voltage is set at 160% of $V_{bat}$, leaving the DC voltage across the converter C2 at 60% of $V_{bat}$. Referring to FIG. 8d, with +/− 20% grid voltage fluctuation and at the worst case (phase angle δ=30°), the maximum reactive power demand from grid side to converter C2 is about 0.4 per unit. Therefore, assuming 100% of reactive power support of converter C1 in different conditions (eg, during the night time when PV energy is not available) the power factor can be improved to unity for $V_{gP.U}<1.2$. Assuming only 50% of reactive power support of converter C1 in different conditions (eg, during the daytime when PV energy is available) the power factor can be improved to unity for $V_{gP.U}<1.1$. Nonetheless, if δ is limited to 20°, the system 22 can provide the demanded reactive power and make the system operate at unity power factor (FIG. 9c) (when only 0.2 per unit reactive power was provided by the converter C1).

Figure 11A:
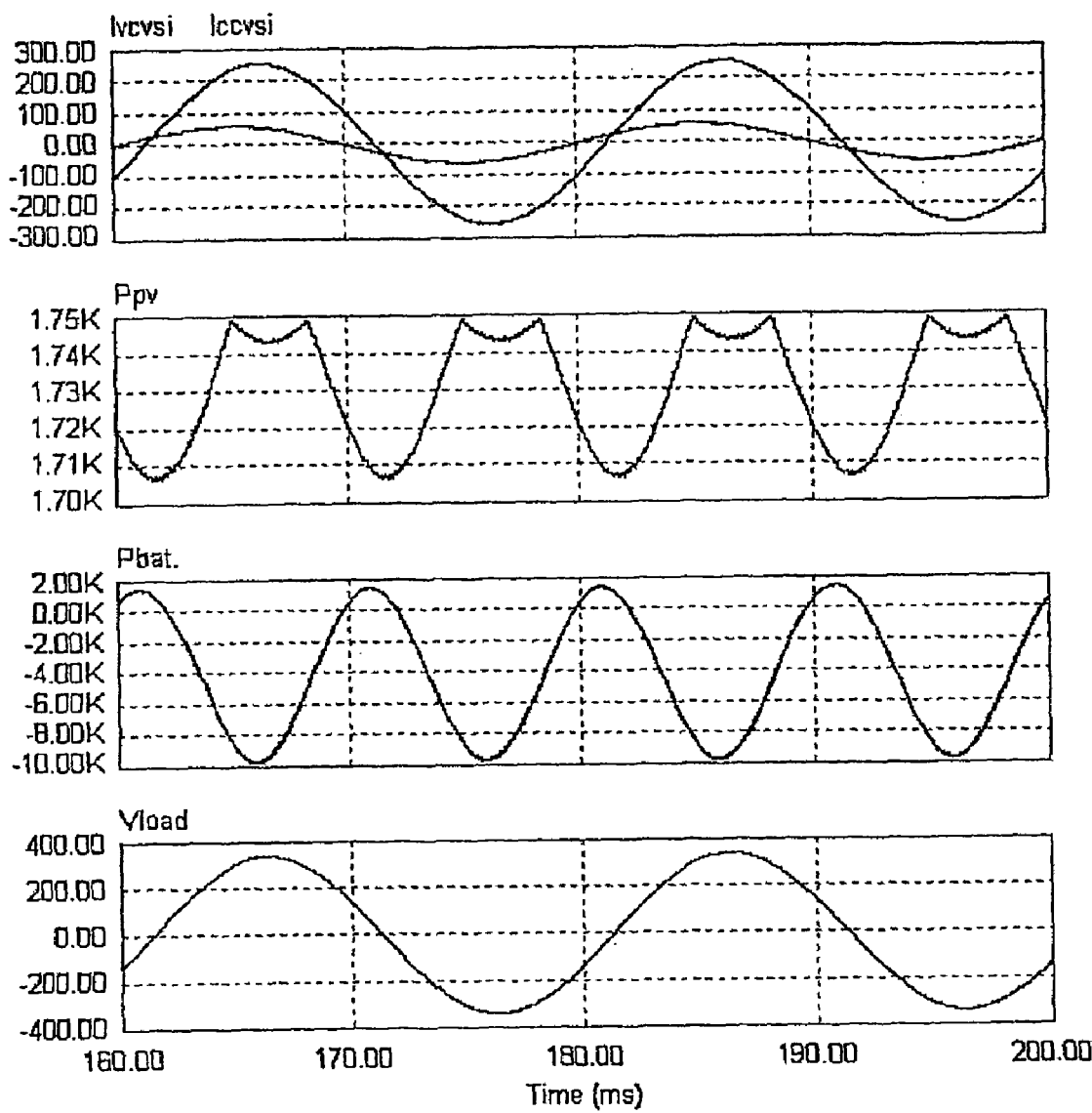
Figure 11B:
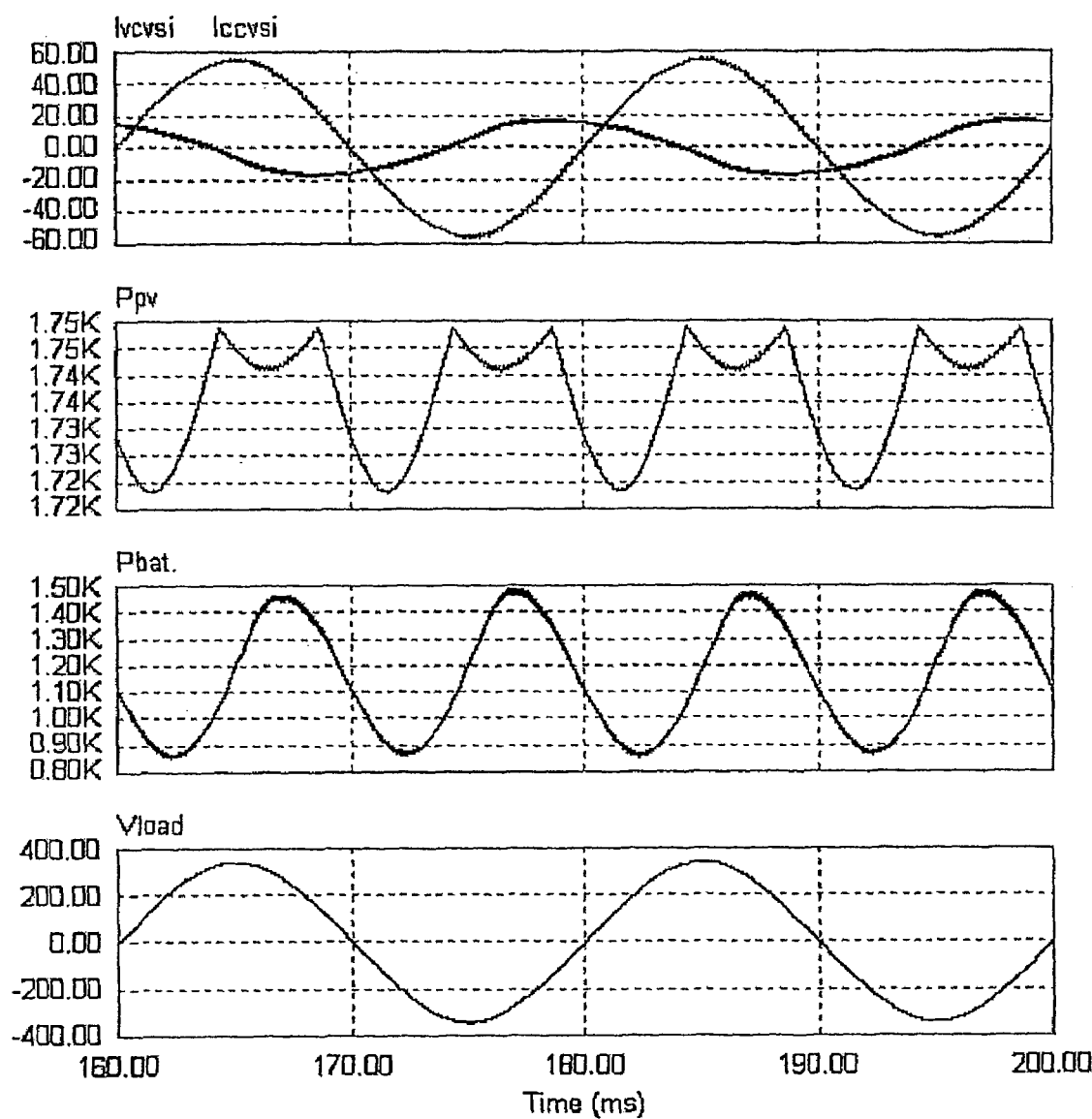
FIG. 11b is simulation result of the current, voltage and power flow within the system show in FIG. 9a at MPPT when only the DC source supplies energy to both the energy storage device and load.
Figure 12A:
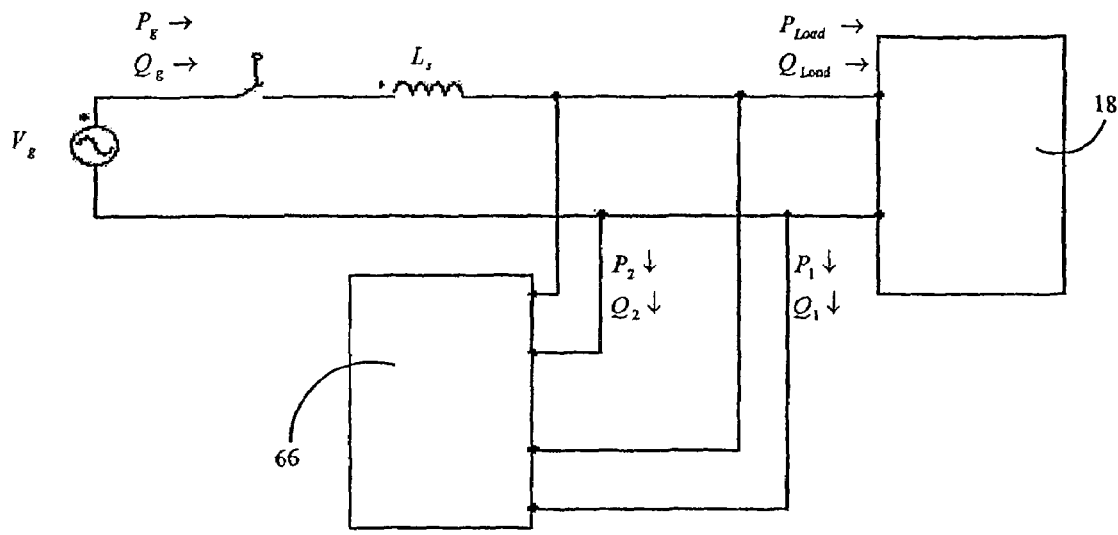
FIG. 12a is a simplified equivalent circuit of the system configuration shown in FIG. 3b; and, FIG. 12b is a simplified equivalent circuit of the system configuration shown in FIG. 3c.
Figure 12B:
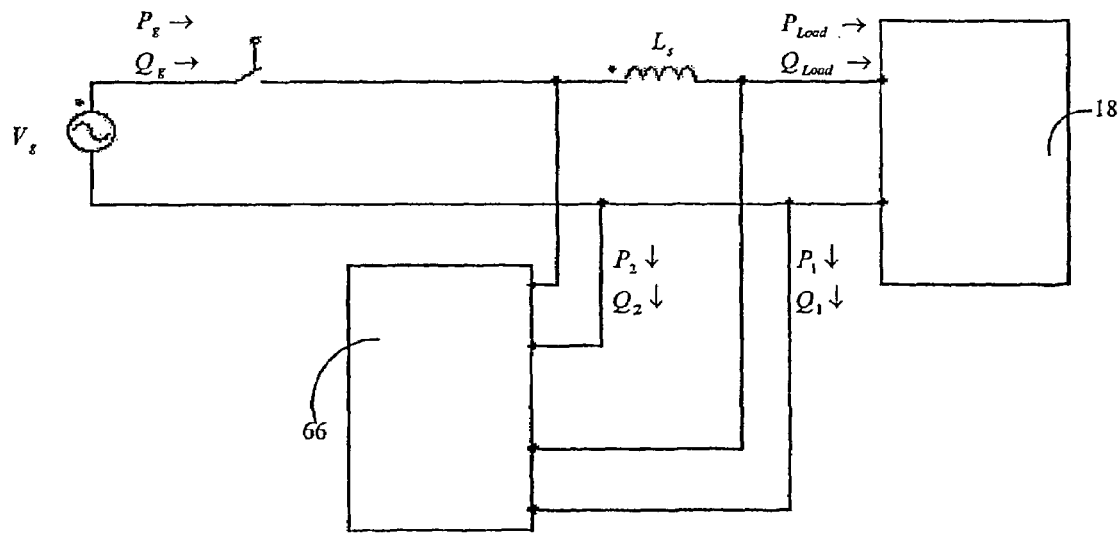

As an example simulation of a system (consisting of a power supply S comprising 16 PV panels (80 W) at 80V with $V_{bat}=48V$ and S=5 KVA) confirms the validity of the proposed concept and hardware (FIGS. 11a and 11b). The result of the simulation is given in the table 1.

TABLE 1

| Case | $C_1$ [A] | $C_2$ [A] | $V_{load}$ [V] | $P_{bat}$ [KW] | $P_{PS}$ [KW] | Load [Ω] |
|---|---|---|---|---|---|---|
| $P_{PS}$ & $P_{bat} \rightarrow P_{load}$ | 22.9 | 172.8 | 234.7 | 4.24 | 1.26 | 10 |
| $P_{PS} \rightarrow P_{load}$ & $P_{bat}$ | 24.6 | 6.4 | 236.7 | −7.18 | 1.27 | 100 |

The efficiency of the preferred implementation of the system 22 and power conditioner 66 operating in different modes will now be examined. In the following analysis, of all of the following possible modes of operation, the voltage and frequency of the load 18 is assumed constant. Hence, the following results demonstrate the steady-state condition of system 22 in each mode of operation.

With the active and reactive power of the whole system balanced through the proposed power conditioner 66, the following conditions can be provided:
1. The load 18 is fed from the AC grid 20 at unity power factor
2. The excess power of the DC source S can be delivered to the AC grid 20
3. The system 22 works with high reliability and energy backup.

Based on the possible power flows through the circuit branches as shown in FIG. 4 and FIG. 9a, different modes of operation can be extracted as follows. The main modes of operation are given in the table 2, based on the following assumptions:
   Efficiency $\eta_1$ of the converter C1 including its transformer 54, 58=85%
   Efficiency $\eta_2$ of the converter C2 including its transformer 56, 58=92%
   Efficiency of the battery 50 Charging $\eta_{Bat.C}=80\%$, Discharging $\eta_{Bat.D}=90\%$
   Conduction losses are negligible
   Resolution of the MPPT including in the controller 62=100%

$$\frac{V_2}{V_{Bat.}} = 0.40$$

Note:

As $\frac{V_2}{V_{Bat.}}$ decreases, the overall efficiency of the system will improve. The controller $X_s$ can be configured to minimize the voltage $V_1$ wherever possible, given other system requirements. For example, the maximum power point tracking algorithm should work based on maximizing delivered power rather than maximizing the actual power produced by the photovoltaic panel PV.

TABLE 2

Main modes of operation of the proposed system

| | Grid 20 | SOURCE S | | Battery 50 | | | Converter C1 | | Converter C2 | | Load | |
|---|---|---|---|---|---|---|---|---|---|---|---|---|
| | $P_g$ | $I_{PS}$ | MPPT | $I_{Bat.}$ | $P_{Bat.}$ | $P_2$ | $V_2$ | $I_2$ | $P_1$ | $I_1$ | $P_{Load}$ | |
| | | | | | Grid connected | | | | | | | |
| Grid → Load | Y | N | N | 0 | 0 | 0 | 0 | 0 | 0 | 0 | $P_{grid}$ | |
| Grid → Battery | Y | N | N | + | $-P_1$ | 0 | 0 | 0 | $P_g$ | $-I_{Bat.}$ | 0 | |
| Grid & Battery → Load | Y | N | N | – | – | 0 | 0 | 0 | $P_{Bat.}$ | $-I_{Bat.}$ | $P_g + P_{Bat.}$ | |
| Grid & SourceS → Load | Y | Y | Y | 0 | 0 | $V_2 \cdot I_2$ | + | $I_{PS}$ | $V_1 \cdot I_1$ | $I_2$ | $P_g + P_{PS}$ | |
| Grid & SourceS & Battery → Load | Y | Y | N | – | – | ≈0 | ≈0 | $I_{PS}$ | + | $I_{PS-} - I_{Bat.}$ | $P_g + P_{PS} + P_{Bat.}$ | ** |
| " | Y | Y | Y | – | – | + | + | $I_{PS}$ | + | $I_{PS-} - I_{Bat.}$ | $P_g + P_{PS} + P_{Bat.}$ | |
| | | | | | Stand Alone | | | | | | | |
| SourceS → Battery | N | Y | Y | + | $P_{PS} - P_2$ | + | + | $I_{Bat.}$ | $-P_2$ | – | 0 | ☼ |
| SourceS → Load | N | Y | Y | 0 | 0 | + | + | $I_{PS}$ | + | $I_{PS}$ | $P_S$ | |
| Battery → Load | N | N | N | – | $-P_{Load}$ | 0 | 0 | 0 | + | $-I_{Bat.}$ | $-P_{Bat.}$ | |
| SourceS & Battery → Load | N | Y | N | – | – | ≈0 | ≈0 | $I_{PS}$ | + | $I_{PS-} - I_{Bat.}$ | $P_{PS} - P_{Bat.}$ | *<br>** |
| " | N | Y | Y | – | – | + | + | $I_{PS}$ | + | $I_{PS-} - I_{Bat.}$ | $P_{PS} + P_{Bat.}$ | * |
| SourceS → Load & Battery | N | Y | Y | + | + | + | + | $I_{PS}$ | +/– | $I_{PS-} - I_{Bat.}$ | $P_{PS} - P_{Bat.}$ | ☼ |

\* Can be happened in Grid connected mode as well
\*\* In low radiation level we chose this mode of operation to reduce the losses
Y Yes (available)
N No (unavailable)
+ Exist in the same direction
– Exist in the opposite direction
0 Does not exist
☼ Important note, refer to the relevant section 1. Grid 20→Load 18

In this mode the grid 20 alone provides the required power for the load 18. Moreover, the battery 50 need not be discharged during this mode of operation. For instance, when the PV is not available, the load 18 can be fed via the grid at high power quality. The efficiency of the whole system in this condition is:

$$\eta = \frac{P_{load}}{P_g} = \frac{P_g}{P_g} = 100\%$$

2. Grid 20→Battery 50

In this mode, the grid 20 alone provides the required power for charging the battery 50. For instance, when the Source S is not available and ignoring the local AC load 18, the efficiency of the whole system in this condition is:

$$\eta = \frac{P_{Bat.}}{P_g}$$

where: $P_{Bat.} = \eta_{Bat.C} \cdot \eta_1 \cdot P_g$

Thus the system operates at an efficiency of 73.6%.

3. Source S→Battery 50

In this mode, the PV alone provides the required power for charging the battery 50 at the Maximum Power Point (MPP). The MPP can be obtained by adjusting the converter C2 voltage $V_2$. This situation can occur, for example, when the Source S is available and load is not present and also the battery 50 is not full charged.

☼ For proper system operation a power loop between converters C1 and C2 is required. But in this case because of MPPT we can not reduce $V_2$.

The efficiency of the whole system in this condition is:

$$\eta = \frac{P_{Bat.}}{P_{PS}} = \frac{P_{PS} - P_{loss}}{P_{PS}}$$

where:

$P_{loss2} = V_2 \cdot I_{PS}(1-\eta_2)$, $P_{loss1} = V_2 \cdot I_{PS}\eta_2(1-\eta_1)$, $P_{loss} = P_{loss1} + P_{loss2}$ Thus the system operates at efficiency more than 75.02%.

4. Source S→Load 18

In this mode, the PV alone provides the required power for feeding the AC load 18 at MPP. The MPP can be obtained by adjusting the converter C2 voltage $V_2$. This situation can occur, for example, when the SOURCE S is available and can produce more power the load 18 demands.

The efficiency of the whole system in this condition is:

$$\eta = \frac{P_{load}}{P_{PS}}$$

where: $P_{load} = P_{1ac} + P_{2ac}$, $P_{2ac} = \eta_2 \cdot P_{2dc}$, $P_{1ac} = \eta_1 \cdot P_{1dc}$ Thus the system operates at an efficiency of 90%.

5. Battery 50→Load 18

In this mode, the battery 50 alone provides the required power for feeding the load 18. This situation can occur, for example, when the Source S and AC grid 20 are not available and the battery 50 can produce more power than the load 18 demands.

The efficiency of the whole system in this condition is:

$$\eta = \frac{P_{load}}{P_{Bat.}}$$

where: $P_{1ac}=P_{load}$, $P_{1dc}=\eta_1 \cdot P_{1ac}$, $P_{1dc}=\eta_{Bat.D} P_{Bat}$.

Thus the system operates at an efficiency of 82.8%.

6. Source S & Battery 50→Load 18

In this mode, the SOURCE S and battery 50 provide the required power for feeding the load at MPP. The MPP can be obtained by adjusting the converter C2 voltage $V_2$. This situation can occur, for example, when the Source S is available but cannot alone produce the required power for load 18.

The efficiency of the whole system in this condition is:

$$\eta = \frac{P_{load}}{P_{APV} + P_{Bat.}}$$

where:

$P_{load}=P_{1ac}+P_{2ac}$, $P_{2ac}=\eta_2 \cdot P_{2dc}$, $P_{1ac}=P_{1dc} \cdot \eta_1$,
$P_{1dc}=V_{Bat.}(I_S+\eta_{Bzt.D} \cdot I_{Bat.}) \cdot \eta_1$ The system operates at an efficiency between 82.8 to 90% (Note: for $$\frac{V_2}{V_{Bat.}} > 0.40$$

this efficiency will slightly decrease).

7. AC Grid 20 & Battery 50→Load 18

In this mode, the battery 50 and grid 20 provide the required power for feeding the load 18. This situation can occur, for example, when the source S is not available and the battery 50 alone cannot produce the required power for the load 18.

The efficiency of the whole system in this condition is:

$$\eta = \frac{P_{load}}{P_{grid} + P_{Bat.}}$$

where: $P_{load}=P_g+P_{1ac}$, $P_{1ac}=\eta_1 \cdot P_{1dc}$, $P_{1dc}=\eta_{Bat.D} \cdot P_{Bat}$.

Thus the system operates at an efficiency between 82.8% and 100%.

8. AC Grid 20 & Source S→Load 18

In this mode, the Source S and the AC grid 20 provide the required power for feeding the load 18 at MPP. The MPP can be obtained by adjusting the converter C2 voltage $V_2$. This situation can occur, for example, when the Source S is available but cannot alone produce the required power for load 18.

The efficiency of the whole system in this condition is:

$$\eta = \frac{P_{load}}{P_g + P_S}$$

where: $P_{load}=P_g+P_{2ac}+P_{1ac}$, $P_{1ac}=\eta_1 \cdot P_{1dc}$, $P_{2ac}=\eta_2 \cdot P_{2dc}$ The system operates at an efficiency between 90% (Note: for $$\frac{V_2}{V_{Bat.}} > 0.40$$

this efficiency will slightly decrease) and 100%.

9. AC Grid 20 & Source S & Battery 50→Load 18

In this mode, the SOURCE S, the AC grid 20 and battery 50 provide the required power for feeding the load 18 at MPP. The MPP can be obtained by adjusting the converter C2 voltage $V_2$. This situation can occur, for example, when the Source S is available but cannot produce the required power for the load 18 even with AC grid 20 support.

The efficiency of the whole system in this condition is:

$$\eta = \frac{P_{load}}{P_{grid} + P_{Bat.} + P_S}$$

where: $P_{load}=P_{1ac}+P_{2ac}+P_g$, $P_{2ac}=\eta_2 \cdot P_{2dc}$, $P_{1ac}=P_{1dc} \cdot \eta_1$ The system operates at an efficiency between 82.8% and 100%.

10. Source S→Load 18 & Battery 50

In this mode, the Source S alone provides the required power for feeding the load 18 and for charging the battery 50 at MPP. The MPP can be obtained by adjusting the converter C2 voltage $V_2$. This situation can occur, for example, when the Source S is available and can produce the required power.

If $P_{Bat.}>P_{load}$, the difference in power will need to be looped through converter C2 and then rectified back through converter C1.

The efficiency of the whole system in this condition is:

$$\eta = \frac{P_{load} + P_{Bat.}}{P_{AES}}$$

where: $P_{AES}=P_{Bat.}+P_{1dc}+P_{2dc}$, $P_{1ac}=\eta_1 \cdot P_{1dc}$, $P_{2ac}=\eta_2 \cdot P_{Bat.}$, $P_{load}=P_{2ac}+P_{1ac}$ Thus the system operates at an efficiency between 75.02% and 90%.

11. AC Grid 20→Load 18 & Battery 50

This mode is similar to mode 2 except that the AC grid 20 also has to provide load 18 power. The system 22 operates at an efficiency between 73.6% and 100% depending on how much energy is required for charging the battery 50.

12. Source S→AC Grid 20

This mode is similar to mode 4 except that the Source S power is supplied to the AC grid 20 in the absence of a local AC load 18. The system 22 operates at an efficiency of 90%.

13. Battery 50→AC Grid 20

This mode is similar to mode 5 except that the battery 50 provides power to the AC grid 20 in the absence of a local AC load 18. The system 22 operates at an efficiency of 82.8%.

14. Source S & Battery 50→Grid 20

This mode is similar to mode 6 except that both the Source S and the battery 50 provide power to the AC grid 20 in the absence of a local AC load 18. The system 22 operates at an efficiency between 82.8 to 90% (Note: for $$\frac{V_2}{V_{Bat.}} > 0.40$$

this efficiency will slightly decrease).

15. Battery 50→Load 18 & Grid 20

This mode is similar to mode 13 except that part of the battery 50 power is provided to the load 18 and the rest to the AC grid 20. The system 22 operates at an efficiency of 82.8%.

16. Source S→Load 18 & Grid 20

This mode is similar to mode 12 except that part of the source S power is provided to the load 18 and the rest to the AC grid 20. The system 22 operates at an efficiency of 90%.

17. Source S & Battery 50→Load 18 & Grid 20

This mode is similar to mode except that part of the source S and battery power 50 is provided to the load 18 and the rest to the grid 20. The system 22 operates at an efficiency between 82.8 to 90% (Note: for $$\frac{V_2}{V_{Bat.}} > 0.40$$

this efficiency will slightly decrease).

18. Source S→Battery 50 & Load 18 & Grid 20

This mode is similar to mode 10 except that the source S power is provided to the load 18, the battery 50, and the grid 20.

※ If $P_{Bat.}>\rightarrow P_{load}+P_g$, the difference in power will need to be looped through converter C2 and then rectified back through converter C1. Thus the system 22 operates at an efficiency between 75.02% and 90%.

What is claimed is:

1. A power conversion system comprising:
a first converter including a DC side and an AC side;
a second converter including a DC side and an AC side;
a bi-directional electrical energy storage device; and
a DC uni-directional energy source;
wherein the DC sides of said first and second converters are connected together in series, said bi-directional electrical energy storage device is connected in parallel to the DC side of said first converter, and said DC uni-directional energy source is coupled across the DC sides of said first and second converters.

2. The system according to claim 1, wherein said second converter is an inverter.

3. The system according to claim 1, wherein said second converter is a bi-directional inverter.

4. The system according to claim 1, wherein said first converter is an inverter.

5. The system according to claim 1, wherein said first converter is a bi-directional inverter.

6. The system according to claim 1, wherein said first converter is a bi-directional inverter and said second converter is an inverter.

7. The system according to claim 1, wherein the AC sides of said first and second converters are connected together in parallel.

8. The system according to claim 1, further comprising:
an AC grid and an AC load;
wherein the AC side of said second converter is connected to said AC grid, and the AC side of said first converter is connected to said AC load, with a coupling inductor placed between said AC grid and said AC load.

9. The system according to claim 6, wherein each of said first and second converters comprise any one of:
a single phase full bridge converter, a single phase half bridge converter, a three phase converter with three half-bridges, a phase shifted converter, a switch mode converter, and a voltage source inverter.

10. The system according to claim 1, wherein said first converter is a voltage controlled voltage source inverter.

11. The system according to claim 10, wherein said second converter is a current controlled voltage source inverter.

12. An uninterruptible power supply (UPS) comprising:
a power conversion system according to claim 1;
an AC grid coupled across the AC sides of said first and second converters; and
an AC load coupled across the AC side of said first converter.

13. The UPS according to claim 12, wherein said AC load and AC grid are either tied directly together or with a coupling inductor between them.

14. A method for converting power between a DC power source and an AC system comprising:
(a) providing first and second converters, each having an AC side and a DC side;
(b) providing an electrical energy storage device;
(c) connecting the DC sides of said first and second converters together in series;
(d) connecting the AC sides of said first and second converters together in parallel;
(e) connecting said electrical energy storage device in parallel across the DC side of said first converter;
(f) providing a DC port for connecting said DC power source across the DC sides of said converters; and
(g) providing AC ports for connecting said AC system in parallel across the AC side of said converters;
wherein, when an AC system is coupled to said AC ports and a DC power source is connected to said DC port, power from the DC power source can flow through said converters to said energy storage device and said AC system; power from said electrical energy storage device can flow through said first converter to said AC system; and, power from said AC system can flow through said first converter to said electrical energy storage device.

15. The method according to claim 14, wherein (d) includes connecting said AC sides either directly or with a coupling inductor between them.

16. The method according to claim 15, further comprising:
(h) controlling real power flow of said first converter so as to regulate the DC current of said DC power source to thereby provide for maximum power point tracking of said DC power source.

17. The method according to claim 16, further comprising:
- (h) controlling real power flow of said second converter to regulate the amount of energy delivered to or from said electrical energy storage device.

18. The method according to claim 17, further comprising:
- (h) controlling real power flow of said second converter to regulate the amount of energy delivered from said DC power source.

19. The method according to claim 18, further comprising:
- (h) controlling reactive power flow of either or both of said first or second converters to achieve a desired power quality on the AC side.

20. The method according to claim 19, wherein when said AC system includes an AC load and a parallel coupled AC grid, said method further comprises:
- (h) controlling reactive power flow of either of said first or second converters to regulate the power factor of said AC grid.

21. The method according to claim 20, further comprising:
- (h) controlling real power flow of either of said first or second converters so as to regulate the AC load voltage magnitude or wave form.

22. The method according to claim 21, further comprising:
- (h) controlling reacting power flow of either of said first or second converters so as to regulate the AC load voltage magnitude or wave form.

23. The method according to claim 22, further comprising:
- (h) controlling harmonic power flow of either of said first or second converters so as to regulate the AC load voltage magnitude or wave form.

24. The method according to claim 23, further comprising:
- (h) controlling reactive power flow of either of said first or second converters to provide active VAR compensation for AC grid.

25. The method according to claim 24, further comprising:
- (h) controlling harmonic power flow of either of said first or second converters to provide active cancellation of current harmonics of said AC system.

* * * * *